US012712419B2

(12) United States Patent
Reimnitz et al.

(10) Patent No.: US 12,712,419 B2
(45) Date of Patent: Aug. 18, 2026

(54) AXIAL FLUX MOTOR WHICH IS FIXED TO A HOUSING AND HAS AN ADJUSTMENT FUNCTION

(71) Applicant: Schaeffler Technologies AG & Co. KG, Herzogenaurach (DE)

(72) Inventors: Dirk Reimnitz, Bühl (DE); Ivo Agner, Bühl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 202 days.

(21) Appl. No.: 18/702,867

(22) PCT Filed: Oct. 24, 2022

(86) PCT No.: PCT/DE2022/100781
§ 371 (c)(1),
(2) Date: Apr. 19, 2024

(87) PCT Pub. No.: WO2023/072337
PCT Pub. Date: May 4, 2023

(65) Prior Publication Data

US 2024/0429800 A1 Dec. 26, 2024

(30) Foreign Application Priority Data

Oct. 26, 2021 (DE) ..................... 10 2021 127 749.3

(51) Int. Cl.
*H02K 21/02* (2006.01)
*H02K 5/173* (2006.01)
*H02K 7/08* (2006.01)

(52) U.S. Cl.
CPC ......... *H02K 21/026* (2013.01); *H02K 5/1732* (2013.01); *H02K 7/083* (2013.01); *H02K 2213/09* (2013.01)

(58) Field of Classification Search
CPC ...... H02K 16/04; H02K 15/16; H02K 21/026; H02K 21/24; H02K 2213/09; H02K 1/182;
(Continued)

(56) References Cited

U.S. PATENT DOCUMENTS 6,057,622 A * 5/2000 Hsu ..................... H02K 21/046 310/407
6,072,258 A * 6/2000 Lamb .................. H02K 49/046 310/90
(Continued)

FOREIGN PATENT DOCUMENTS

DE 102007037842 A1 * 4/2008 ............. H02K 15/16
DE 102020104857 A1 12/2020

OTHER PUBLICATIONS

English Translation of DE102007037842A1 (Year: 2008).*

*Primary Examiner* — Terrance L Kenerly
*Assistant Examiner* — Theodore L Perkins
(74) *Attorney, Agent, or Firm* — Volpe Koenig

(57) ABSTRACT

An axial flux machine is provided having a housing in which a stator is provided that has a first and a second stator half, the stator halves being secured to the housing, and a rotor which is arranged between the stator halves and which contacts a rotor shaft in a rotationally fixed manner, the rotor shaft being rotatably mounted relative to the stator and the housing via bearing points. A separate adjusting element which adjusts the axial spacing between the rotor and the stator halves is arranged between at least one of the stator halves and the housing. An installation method for axially aligning the assemblies relative to one another is also provided.

16 Claims, 4 Drawing Sheets

(58) Field of Classification Search
CPC .. H02K 1/2793; H02K 1/2798; H02K 49/108; H02K 1/2796
See application file for complete search history.

(56) References Cited

U.S. PATENT DOCUMENTS

| | | | | |
|---|---|---|---|---|
| 2017/0110946 | A1* | 4/2017 | Oktavec | H02K 9/04 |
| 2018/0323679 | A1* | 11/2018 | Woolmer | H02K 1/182 |

* cited by examiner

AXIAL FLUX MOTOR WHICH IS FIXED TO A HOUSING AND HAS AN ADJUSTMENT FUNCTION

CROSS-REFERENCE TO RELATED APPLICATIONS

This application is the U.S. National Phase of PCT Appln. No. PCT/DE2022/100781, filed Oct. 24, 2022, which claims priority to German Patent Application No. 10 2021 127 749.3, filed Oct. 26, 2021, the entire disclosures of which are incorporated by reference herein.

TECHNICAL FIELD

The present disclosure relates to an electric axial flux machine, in particular an electric motor, having a housing in which a stator is provided with two stator halves and a rotor which is arranged between the two stator halves. Here, the stator and rotor are supported by the housing surrounding the axial flux machine. The width of the air gap between the two stator halves and the spacing between the stator halves and the rotor can further be adjusted using adjusting elements between different assemblies of the axial flux machine. In addition, the disclosure also relates to an installation method for axially aligning the assemblies relative to one another.

BACKGROUND

For electric motors, it is important to align the components through which the magnetic field flows very precisely, since even small deviations in the position of the components among one another can have a significant effect on the magnetic flux (e.g., due to altered air gaps). It is therefore important that the mechanical structure of the electric motor ensures the necessary exact positioning of the components through which the magnetic field flows. This is achieved by a rigid mechanical structure that is insensitive to tolerances and by very precise manufacturing of the components. Dimensional deviations in the components of the electric motor through which the magnetic field flows, regardless of whether they are shape deviations or positional deviations, impair the efficiency, the service life, and/or the performance of the electric motor.

In the practical design of electric motors, the need to manufacture the components of an electric motor as precisely as possible, in particular for motor vehicles, is often at odds with the ever-present requirements in vehicle construction for manufacturing processes suitable for large-scale production, insensitivity to tolerances and low costs. The same applies to the tolerance insensitivity of the structures. For example, a direct bearing point between the rotor and the stator of an electric motor is a very effective means of keeping the tolerance chain between the components through which the magnetic field flows as small as possible. However, such a direct bearing point also incurs additional costs and restricts the design options with regard to the motor.

Electric machines, in particular electric motors for motor vehicles, usually have to be enclosed in a housing so that the electric motor is protected from external influences such as dirt, moisture or damage, thus also preventing the electric motor itself from posing a risk to its surroundings or nearby persons. As the protective housing that encloses the electric motor is usually required in motor vehicles anyway, it makes sense from an economical standpoint to fasten components or assemblies of the electric motor directly to this housing of the electric motor. The supporting structure of the electric motor, which holds the components through which the magnetic field flows in position, can be made weaker or even be completely omitted in some places, as the electric motor housing takes over the supporting and holding function entirely or at least in part. For example, no direct bearing point is then required between the rotor and the stator if the rotor and the stator are supported separately on the housing of the electric motor. This lowers costs and reduces the installation space required in some places. However, this also increases the tolerance chain between the rotor and the stator. If this leads to an inaccurate alignment of the components through which the magnetic field flows, this ultimately has a negative impact on the efficiency of the electric motor.

SUMMARY

The present disclosure is therefore based on the object of eliminating or at least minimizing the disadvantages described above. In particular, it is the object of the disclosure to provide axial flux machines, in particular axial flux motors, which use the housing of the axial flux motor to position or align the rotor relative to the stator and at the same time ensure a high degree of alignment accuracy of the components through which the magnetic field flows by using spacer elements or adjusting elements as well as the installation methods and adjustment procedures described below. By using the motor housing as a supporting structure for the electric motor and thus reducing the effects of the long tolerance chain in a simple manner, the axial flux motors presented below represent a particularly economical concept.

This object is achieved by an axial flux machine having one or more of the features disclosed herein. Furthermore, an installation method having one or more of the features disclosed herein of this axial flux machine according to the disclosure is also provided. Advantageous embodiments and further developments of the axial flux machine are the subject of the following description and dependent claims.

An axial flux machine is provided with a supporting component, preferably a (motor) housing, in which a stator is provided that has a first and a second stator half, wherein the stator halves are fastened to the housing, and is provided with a rotor which is arranged between the stator halves and which contacts a rotor shaft in a non-rotatable manner, which is rotatably mounted relative to the stator and the housing via bearing points. In this regard, a separate but pre-assembled/dimensionally adjusted adjusting element/spacer element, such as a disc/shim, is arranged between at least one of the stator halves and the housing in order to adjust/adapt the axial spacing between the rotor and the stator halves.

In other words, the axial flux machine according to the disclosure has an I arrangement in which a rotor disc is arranged between two stator halves of a stator and can be subjected to an electromagnetic rotating field via these halves, the magnetic field lines of which extend in the axial direction (in this case of the axial flux machine) in the air gap formed between the rotor and the stator. The special feature of this axial flux machine is that both the stator and the rotor are supported directly or via a rotor shaft on the motor housing and no direct bearing arrangement is provided between the rotor and the stator. Furthermore, the entire stator, consisting of the two stator halves, is fastened/screwed to the motor housing, which forms the component supporting the axial flux machine, in a non-rotatable and non-displaceable manner. At this fastening point, the alignment of the stator relative to the motor housing and thus also relative to the rotor, which is also axially fastened to the motor housing via the rotor shaft, can be changed by varying the thickness of one or more adjusting elements. Alternatively or in addition, the thickness of the adjusting element between the rotor and the shaft, or more precisely the shaft shoulder to which the rotor is attached or against which it rests, can also be changed. The axial position of the rotor relative to the component supporting the axial flux machine and thus also relative to the stator can also be adjusted by changing this adjusting element, which is designed as an adjusting disc.

This reduces costs as well as the required installation space. Since the axial alignment of the stator and rotor to one another is achieved by means of the component supporting the axial flux machine, not only the tolerances and shape deviations of the stator and the rotor must be determined and compensated for in order to correctly adjust the air gap width between the two stator halves, but also the tolerances and shape deviations of the component supporting both the stator and the rotor. For this reason, exact positioning and a high degree of alignment accuracy of the components through which the magnetic field flows can be ensured.

According to an advantageous embodiment, the axial flux machine has a further adjusting element between the two stator halves or in each case between the two stator halves and the housing.

In other words, in a first embodiment, the axial flux machine has a direct connection/screw connection between the two stator halves, which defines the axial alignment of the two stator halves in an exact manner in relation to one another. In a second embodiment, each of the two stator halves is mechanically connected/screwed directly to the motor housing via the respective stator housing, which forms the component supporting the axial flux machine. Nevertheless, axially movable/displaceable or elastic connections, which serve for example for radial centering, insulation, dust or moisture protection, electrical power transmission, data transmission or the transport of coolants or lubricants, can be used to connect the two stator halves of this second embodiment.

For the axial flux motor in the second embodiment described above, the motor housing is the reference part to which the three assemblies, consisting of the right stator half, the rotor and the left stator half, are fastened and aligned and via which the position of the assemblies in relation to one another can also be determined. This results in three points at the three fastening points between the motor housing and the respective assembly of the motor at which the motor assemblies can be aligned using adjusting elements. In order to be able to adjust the width of the right and left air gap, adjustable adjusting elements are required at two of the three points. In this context, no adjusting elements are required directly between the rotor and one of the stator halves or between the two stator halves.

According to a further advantageous aspect of the disclosure, the rotor shaft is mounted on the housing via a bearing transmitting axial forces, wherein the bearing has at least one bearing inner ring or one bearing outer ring and a further adjusting element is arranged at at least one axial end of the bearing inner ring or the bearing outer ring.

In other words, additional adjusting elements are arranged at one or both axial ends of a bearing inner ring or bearing outer ring of the bearing, which is designed to mount the rotor shaft on the motor housing. In this regard, the bearing inner ring is arranged directly on a shaft shoulder of the rotor shaft. The axial position of the rotor shaft and also the position of the rotor fastened to the rotor shaft can be changed/adjusted by varying the thickness of the at least one adjusting element on the bearing inner ring. In this regard, the bearing outer ring is arranged directly on a shoulder of the motor housing. Therefore, alternatively or in addition, the axial position of the bearing and also the position of the rotor fastened to the bearing can be changed/adjusted by varying the thickness of at least one adjusting element on the bearing outer ring. By using these additional adjusting elements, i.e., by increasing the possible application positions for adjusting elements, the flexibility of the adjustments/alignment of the components of the axial flux machine is increased.

According to a further advantageous embodiment, the adjusting elements are composed of several sub-elements stacked on top of one another in order to adjust a required adjustment dimension by means of a combination of a plurality of the sub-elements. In this regard, the required adjustment dimension can be formed by several adjusting elements with the same dimensions (for example with the same thickness) or several adjusting elements with different dimensions (for example with different thicknesses).

In other words, several adjusting elements can be combined in order to adjust/adapt the positions of two assemblies of the axial flux machine according to the v relative to one another in an exact manner. In this regard, several adjusting elements/sub-elements can be stacked one on top of the other, so that the required adjustment dimension is formed or adjusted by the sum of the adjusting element thicknesses. Alternatively or in addition, several adjusting elements can also be distributed adjacent to one another on the contact surfaces of the assemblies or distributed around the circumference of the assemblies.

Though arranging several adjusting elements of the same thickness or several stacks of adjusting elements that form the same adjustment dimension in parallel increases the number of elements required, this also allows the use of smaller and/or more simply shaped adjusting elements. This also makes it easier to use identical adjusting elements at different points or positions in/on the axial flux machine, even though the contact surfaces of the assemblies are designed differently at the respective connection points/contact surfaces, which can reduce manufacturing costs and effort.

In a further advantageous aspect of the disclosure, a plurality of the adjusting elements with different thicknesses is arranged distributed on/around the (inner) circumference of the axial flux machine.

In other words, it is possible to provide a plurality of adjusting elements with different thicknesses. Several sub-elements can also be used to achieve the required overall thickness of the adjusting elements. In this regard, these adjusting elements can have the same or different thicknesses. Essentially, this makes it relatively easy to adjust a correction dimension specially adapted to a particular circumferential position on the axial flux machine. As a result, not only can the axial positions between the assemblies of the axial flux machine be adjusted by moving the assemblies in parallel towards or away from one another by correctly selecting an adjusting element thickness that is consistent on the circumference, but also circumferential waviness of the surfaces/contact areas can be compensated for by the adjusting elements distributed between the assemblies over the circumference of the axial flux machine having different thicknesses. This means that if circumferential waviness and/or other shaping issues occur on a fastening surface/screw-on surface/contact surface of an axial flux machine component that deviates from a flat (vertical in the assembled case) surface, the affected surface can be compensated for or equalized using adjusting elements with different thicknesses that are individually determined and assigned for each affected position.

In a further advantageous aspect of the disclosure, the thicknesses of the adjusting elements preferably increase or decrease uniformly from adjusting element to adjusting element when distributing the plurality of adjusting elements over an (inner) circumference of the axial flux machine.

In other words, the adjusting elements arranged distributed over the circumference of the respective axial flux machine components are designed such that the thicknesses of these adjusting elements (continuously) decrease or increase in a circumferential direction. In particular, thicker adjusting elements are used on one side of the circumference of the respective component than on the opposite side, so that the end faces of the adjacent assemblies, which are to be aligned relative to one another by the adjusting elements, are inclined relative to one another. As a result, the effect of tolerance-related inclinations of individual components in relation to one another on the axial flux machine can be reduced.

For example, in an axial flux machine, an inclined air gap between one stator half and the rotor, which would be significantly less wide on one side than on the opposite side, can be caused by a tolerance-related inclination of one stator half in relation to the rotor. By arranging adjusting elements of different thicknesses between the screw-on surfaces of the two stator halves, the two screw-on surfaces can be aligned in a manner inclined to one another in the opposite direction to the same extent as the tolerance-related inclination. The unintentional inclination in the stator and the inclination introduced by the adjusting elements in a targeted manner thus balance each other out.

According to a further advantageous embodiment of the disclosure, the two stator halves are connected to one another radially outside the rotor.

In other words, in the installed state, the stator halves are arranged in such a way that the radially outer ends of the stator housing of both stator halves, i.e., at the ends that are further away from the rotor shaft, enclose the rotor fastened to the rotor shaft. Furthermore, the stator halves are connected to one another at this position surrounding the rotor, preferably using at least one fastening screw.

The present disclosure also relates to an electric machine arrangement having an axial flux machine according to the disclosure and a power electronics unit and/or a high-voltage battery.

In other words, the axial flux machine described above is arranged within a housing of an electric machine arrangement, which also has a control electronics unit and/or a power electronics unit and/or a high-voltage battery. Advantageously, the housing is also part of a cooling system for the axial flux machine and is designed in such a way that cooling fluid can be supplied to the axial flux machine via the housing and/or the heat can be dissipated to the outside via the housing surfaces. In addition, the housing protects the electric machine and any electronics that might be present from external influences.

The disclosure further relates to an installation method of the axial flux machine according to the disclosure for axially aligning a first assembly comprising a housing and a bearing, a second assembly comprising a first output-side stator half, a third assembly comprising a rotor and a rotor shaft and a fourth assembly comprising a second stator half relative to one another. As preparatory steps, axial actual distances are determined on surfaces of the first, second and third assembly. The actual distances determined in this way are then compared with specified target distances and deviations of the actual distances from the respective target distances are determined. The required thickness of the separate adjusting elements between the surfaces of the output-side stator half and the housing and between the surfaces of the shaft shoulder of the rotor shaft and the bearing can then be determined from these deviations.

In other words, deviations are determined by comparing certain actual distances between surfaces of different assemblies consisting of a housing with a bearing, a first output-side stator half and a rotor with a rotor shaft of the axial flux machine with the corresponding target values. These deviations are used to calculate the corresponding necessary thicknesses of the adjusting elements at the contact position between the output-side stator half and the housing as well as the contact position between the shaft shoulder of the rotor shaft and the bearing.

In a further advantageous aspect of this installation method of the axial flux machine according to the disclosure, axial actual distances are determined on surfaces of the first, second, third and fourth assembly. The actual distances determined in this way are then compared with specified target distances and deviations of the actual distances from the respective target distances are determined. The deviations and the selected thicknesses of the adjusting elements between the surfaces of the output-side stator half and the housing and between the surfaces of the shaft shoulder of the rotor shaft and the bearing are used to determine the required thickness of the adjusting element between the two stator halves or to determine the axial actual distances on the surfaces of the first, third and fourth assembly. The actual distances determined in this way are then compared with specified target distances and deviations of the actual distances from the respective target distances are determined. The required thickness of the adjusting element between the housing and the output-side stator half is determined from the deviations and the selected thickness of the adjusting element between the surfaces of the shaft shoulder of the rotor shaft and the bearing.

The measurement and calculation processes of the installation methods described above, which are used to determine the axial dimensions of the assemblies of the axial flux machine and calculate the required adjusting element thicknesses, can also be used to compensate for angular errors and/or waviness in addition to the axial tolerances. Instead of measuring only one axial distance dimension for each section of the assemblies that are relevant for calculating the correct adjusting element thickness, or using an averaged axial value from several axial measurements distributed around the circumference, the shape of the end faces or contact surfaces must be determined at many points and the alignment of these surfaces to one another must be determined. If the shape and position of the relevant surfaces of each assembly of the axial flux machine are known, the correct or necessary axial adjusting element thickness for this position can also be calculated for each circumferential position at which an adjusting element is to be used between two assemblies.

The installation step described above serves to mount the fourth assembly to the remaining three interconnected assemblies for the first embodiment and for the second embodiment of the axial flux machine according to the disclosure.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the subject matter outlined in the figures and to combine them with other components and knowledge from the present description and/or figures. In particular, it should be noted that the figures and in particular the size relationships shown are only schematic in nature. Identical reference symbols indicate the same objects, so that, where applicable, explanations from other figures can also be used. It is also pointed out that the features of the individual embodiments can be interchanged and can occur in a certain combination.

DETAILED DESCRIPTION

The present disclosure with its advantageous embodiments are described below with reference to the figures.

Figure 1:
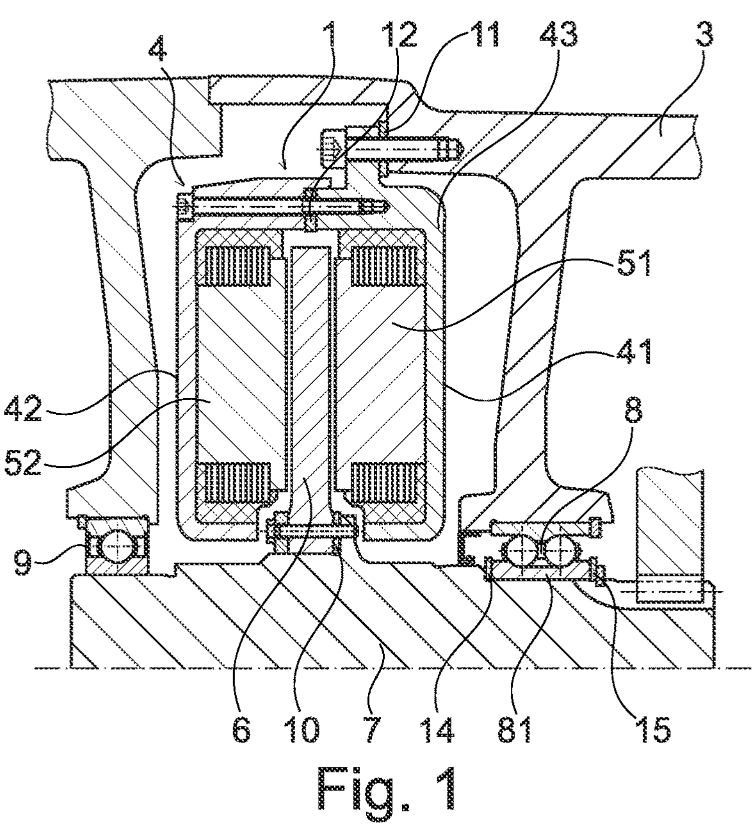
FIG. 1 shows an axial section of an electric axial flux machine in a first embodiment.

FIG. 1 shows an axial section of an electric axial flux machine 1 according to the disclosure in an I arrangement. The axial flux machine 1 has a stator 4 with a first stator half 41 and a second stator half 42, in each of which at least one stator magnet 51, 52 (for example an electromagnet) is arranged, and a rotor 6. Both stator halves 41, 42 are firmly screwed together radially outside the rotor 6. In addition, the stator housing 43 of the output-side stator half 41 (on the right in this figure) is screwed directly to a supporting component, which in this illustrated machine arrangement is part of a motor housing 3. The rotor 6 of the axial flux machine 1, which is arranged in parallel between the two stator halves 41, 42, is firmly screwed to a rotor shaft 7 and is rotatably mounted relative to the stator 4 via this shaft, has rotor magnets (for example permanent magnets). In this regard, the bearing arrangement of the rotor shaft 7 is implemented according to the “fixed bearing and floating bearing” principle. The bearing shown in the figure on the left is the floating bearing 9, which only transmits radial forces and no axial forces. Due to an axially displaceable fit between the rotor shaft 7 and the bearing inner ring, the floating bearing 9 does not transmit any significant axial forces and also does not contribute to the axial positioning of the rotor shaft 7 and therefore does not need to be taken into account for the air gap adjustment between the two stator halves 41, 42. The bearing shown in the figure on the right forms the fixed bearing 8 of the rotor shaft 7, via which radial and axial forces are transmitted, enabling the axial alignment of the rotor shaft 7 and thus also of the rotor 6.

Adjusting elements 10, 12, 11 for spacing apart the components are attached to the contact surfaces between the rotor 6 and a shaft shoulder of the rotor shaft 7 on which the rotor 6 is arranged, between the two stator halves 41, 42 and between the output-side stator half 41 and the motor housing 3. Furthermore, adjusting elements 14, 15 are each arranged on the axial side surfaces of the bearing inner ring 81 of the fixed bearing 8 that rests against the rotor shaft 7. These adjusting elements 10, 11, 12, 14, 15 can be used to adjust the respective spacing between the components. However, only one of the two adjustment options described above and the adjustment option between the stator halves 41, 42 is required in order to adjust the air gap widths of the axial flux machine 1 on the right and left of the rotor 6.

Figure 2:
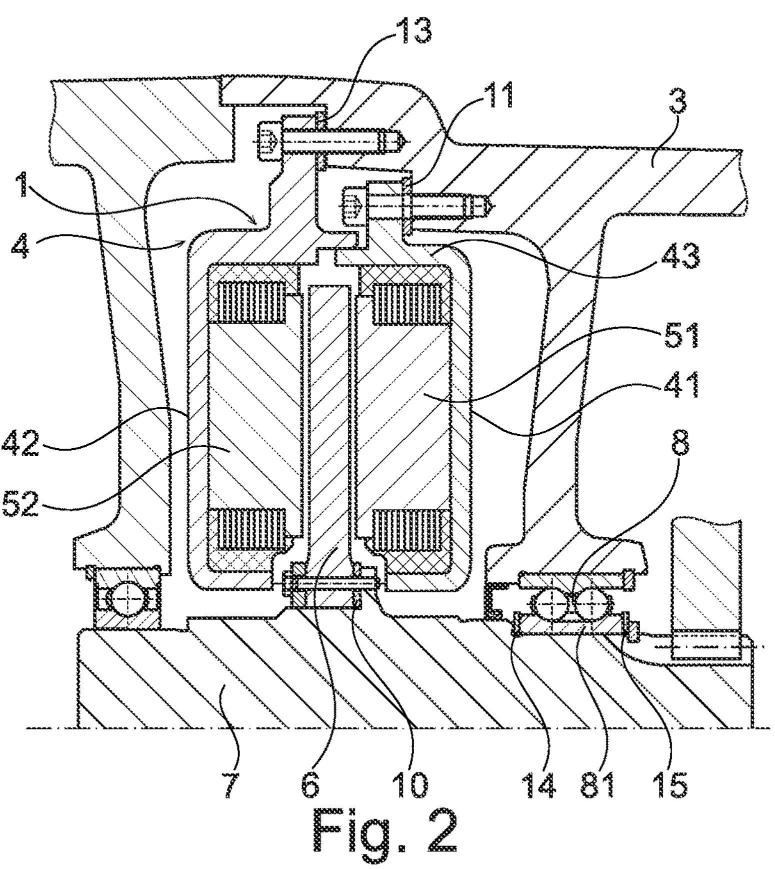
FIG. 2 shows an axial section of an electric axial flux machine in a second embodiment.

FIG. 2 shows an axial section of an electric axial flux machine 1 in an I arrangement in a further embodiment. The axial flux machine 1 has a stator 4 with a first stator half 41 and a second stator half 42, in each of which at least one stator magnet 51, 52 (for example an electromagnet) is arranged, as well as a rotor 6, which is arranged in parallel between the two stator halves 41, 42, is firmly screwed to a rotor shaft 7 and is rotatably mounted relative to the stator 4 via this shaft. In contrast to the embodiment shown in FIG. 1, both stator halves 41, 42 are screwed directly to a part of a motor housing 3 via their stator housing 43 and have no mechanical connection or screw connection between the two stator halves 41, 42. Furthermore, the bearing arrangement of the rotor shaft 7 is implemented according to the same “fixed bearing and floating bearing” principle as in the embodiment shown in FIG. 1.

For spacing the components, adjusting elements 10, 11, 13 are provided in FIG. 2 on the contact surfaces between the rotor 6 and a shaft shoulder of the rotor shaft 7 on which the rotor 6 is arranged and on the surfaces on which each stator housing 43 of the two stator halves 41, 42 is in contact with the motor housing 3. Furthermore, adjusting elements 14, 15 are each arranged on the axial side surfaces of the bearing inner ring 81 of the fixed bearing 8 that rests against the rotor shaft 7. These adjusting elements 10, 11, 13, 14, 15 can be used to adjust the respective spacing between the components.

Figure 3:
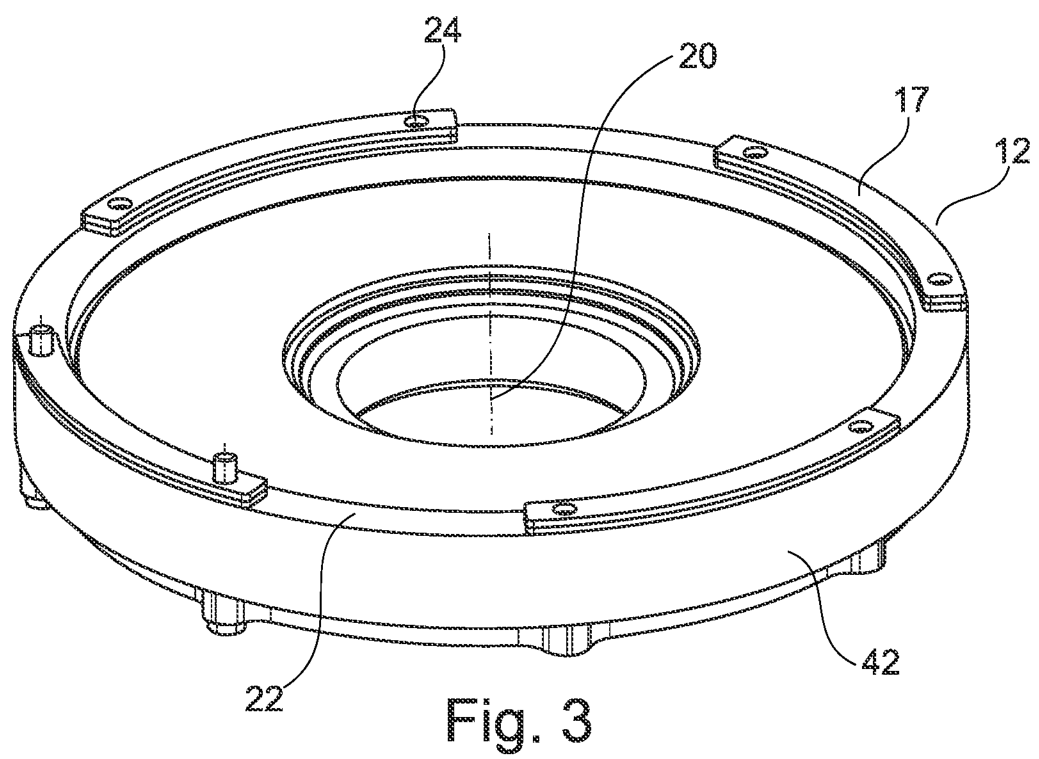
FIG. 3 shows an isometric view of one of the stator halves with an annular contact surface.

FIG. 3 shows an isometric view of the second stator half 42 of the axial flux machine 1 according to the first embodiment with an annular contact surface, over the circumference of which four adjusting elements 12, each consisting of two sub-elements 17, are arranged. In the center of the stator half 42, a through bore 20 is provided, through which the rotor shaft 7 can be guided. In addition, the stator half 42 has a projection 22 projecting parallel to the through bore 20 at the outermost circumference, which forms the annular surface for contacting the illustrated stator half 42 with the output-side stator half 41. Furthermore, eight holes/(through) bores distributed evenly around the circumference of the stator half 42 are provided on the annular surface. The sub-elements 17 of the adjusting elements 12 are elongated and each have two holes 24, via which they can be connected to the holes of the annular surface of the stator half 42 by means of screwing. The design of the adjusting elements 12 consisting of assembled/stacked sub-elements 17, each with two holes 24, facilitates assembly on the one hand and prevents unintentional slipping of the adjusting elements 12 on the other.

Figure 4:
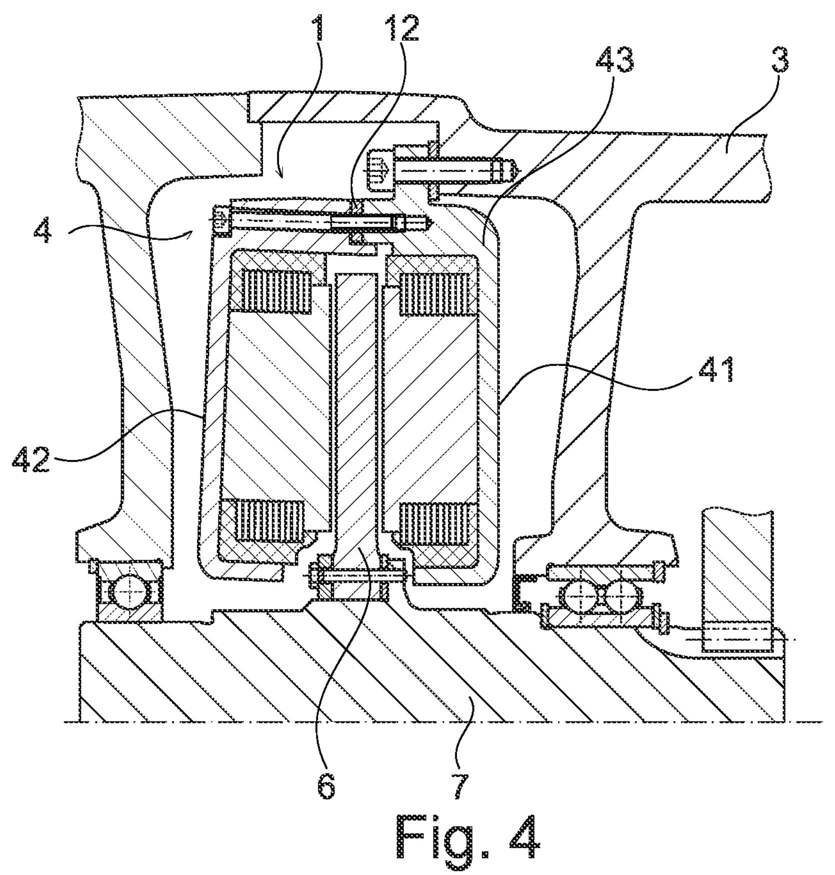
FIG. 4 shows an axial section of an electric axial flux machine in a first embodiment as shown in FIG. 1, in which one stator half has a tolerance-related inclination.

FIG. 4 shows an axial section of an electric axial flux machine 1 in I arrangement in the first embodiment according to FIG. 1, in which the two stator halves 41, 42 are screwed together radially outside the rotor 6, but in which the stator housing 43 of the second stator half 42 (on the left in the figure) is not arranged in parallel along the rotor 6. Essentially, the inner components that form the end face of the stator half 42 facing the rotor 6 are aligned at an angle to the stator housing 43 enclosing the stator half 42 due to tolerances. In this regard, the stator housing 43 also has the screw-on surface for fastening this stator half 42 to the output-side stator half 41. The end face of the affected stator half 42 facing the rotor 6 is aligned parallel to the rotor 6 through an adjustment by means of the adjusting elements 12 described above between the two stator halves 41, 42, so that the rotor 6 is arranged centrally between the two stator halves 41, 42. As a result, the stator housing 43 of the stator half 42 is arranged at an angle to the rotor 6.

Figure 5:
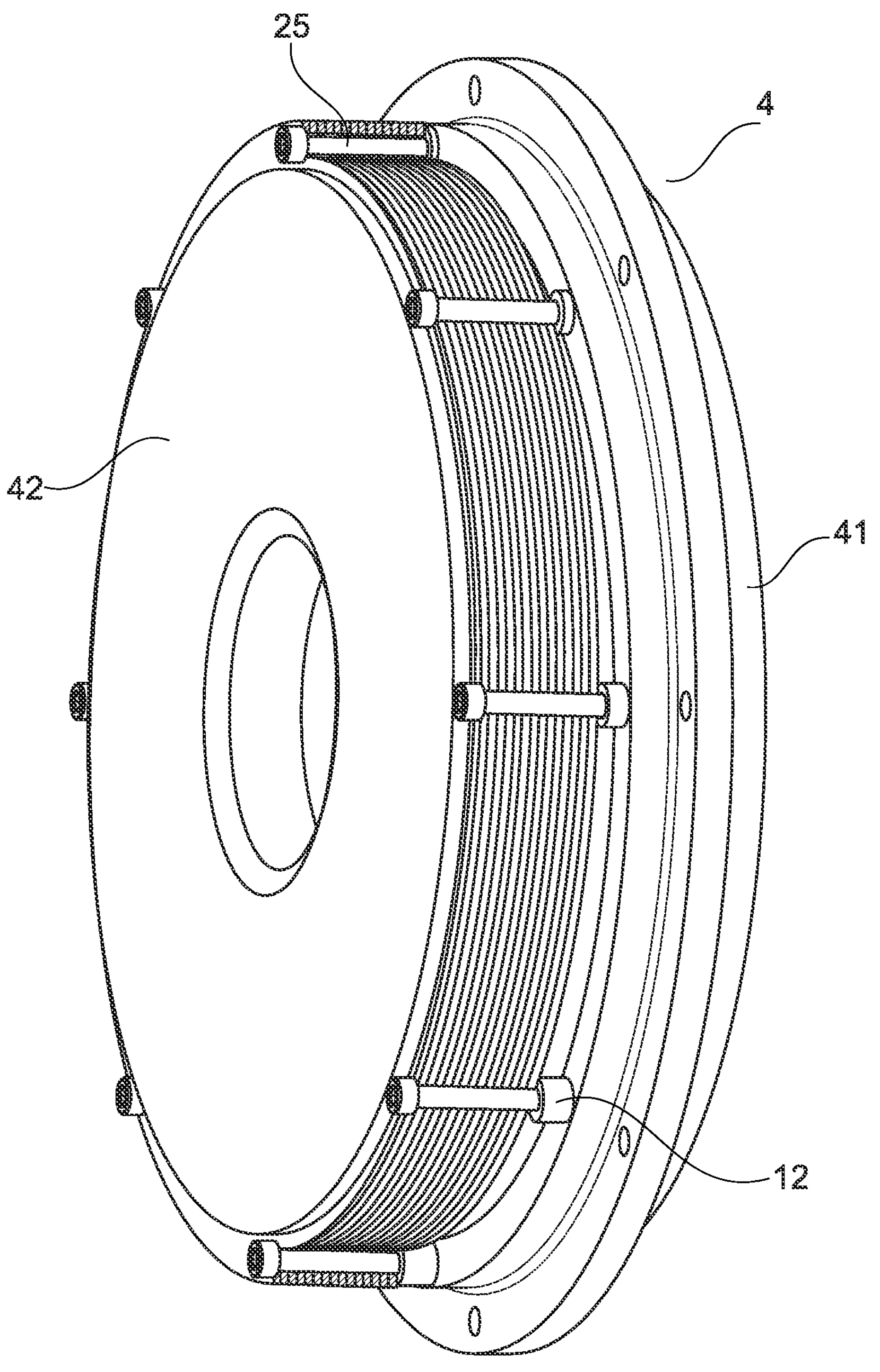
FIG. 5 shows an isometric representation of the two stator halves of the axial flux machine shown in FIG. 4 with adjusting elements of different thicknesses distributed around the circumference.

FIG. 5 shows an isometric representation of the stator 4, which has a tolerance-related inclination of one of the two stator halves 41, 42. The two stator halves 41, 42 have holes distributed evenly around their circumference and are aligned relative to one another via eight adjusting elements 12 with different thicknesses distributed between them at the holes and connected to one another by means of screws 25. So that the screws 25 and the adjusting elements 12 can be better recognized in FIG. 5, the stator housing 42 shown in the figure on the left is not completely shown over one half of the circumference, i.e., the stator housing 42 is provided with a breakout (region of the parallel hatch lines) over approximately 180° of the circumference, as a result of which the screws 25 and adjusting elements 12 are exposed in this region. The adjusting elements 12 are designed as circular rings or discs arranged around the screws 25. In order to be able to align the flat screw-on surfaces of the two stator halves 41, 42 at an angle to one another, the adjusting elements 12 with different thicknesses are arranged over the circumference of the stator 4 in such a way that the thicknesses of the adjusting elements 12 increase gradually from one point (at the top in the figure), at which the adjusting element 12 with the smallest thickness is attached, over the circumference of the stator halves 41, 42 exposed in this illustration and from another point (at the bottom in the figure), at which the adjusting element 12 with the greatest thickness is attached, the thicknesses of the adjusting elements 12 decrease again along the remaining circumference. In the case of these round adjusting elements 12 or adjusting elements 12 that are prevented from turning by their contour, a hole/bore is also sufficient in order to ensure an easy assembly.

Figure 6:
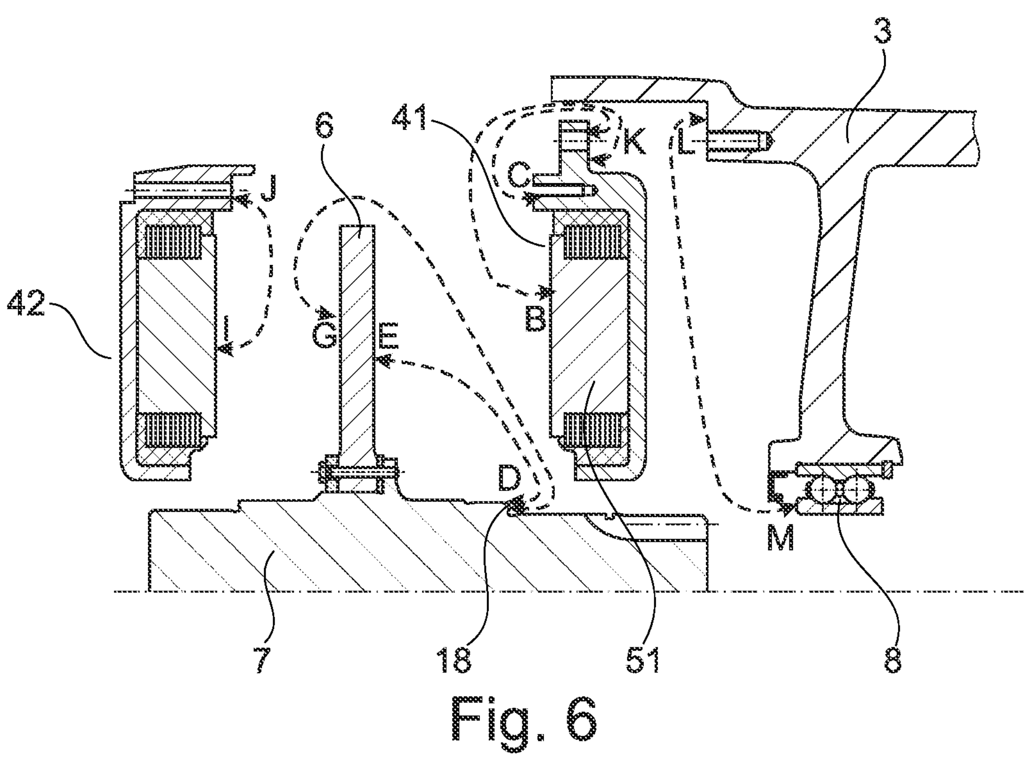
FIG. 6 shows an illustration of an installation method of an axial flux machine of the first embodiment with the contact surfaces of the assemblies.

FIG. 6 shows an assembly process for the axial flux machine 1 of the first embodiment shown in FIG. 1 with two stator halves 41, 42 that can be connected to one another. At the beginning of the assembly process, axial distances between various functionally relevant surfaces between four relevant assemblies are measured. In this regard, various measurement sequences are possible, one of which is described below by way of example. The motor housing 3 together with the fixed bearing 8, which forms a bearing point for the rotor shaft 7, constitutes the first assembly. The axial actual distance $ML_{actual}$ is measured on this assembly and compared with the target distance $ML_{target}$. The output-side stator half 41 is the second assembly on which two axial dimensions are determined. The actual distance $BK_{actual}$ between the stator surface, behind which the first stator magnets 51 are arranged, and the mounting surface via which the output-side stator half 41 is connected to the motor housing 3 is measured, compared with a specified target distance $BK_{target}$ and the deviation $\Delta BK$ is determined. The third assembly has the rotor 6 and the rotor shaft 7 with a first shaft shoulder 18. The actual distance $ED_{actual}$ between the shaft shoulder 18 of the rotor shaft 7, on which the bearing forces are later axially supported, and the rotor surface, behind which the rotor magnets are arranged, is now measured. The rotor surface is located here on the right-hand side of the rotor 6, which faces the first stator half 41. The actual distance $ED_{actual}$ is compared with a target distance $ED_{target}$, from which the deviation $\Delta ED$ is determined. The deviations $\Delta ML$, $\Delta BK$ and $\Delta ED$ of the three actual distances $ML_{actual}$, $BK_{actual}$ and $ED_{actual}$ from the respective target distances $ML_{target}$, $BK_{target}$ and $ED_{target}$ can be used to determine the required thicknesses of the adjusting elements 11, 14 between the first starter half 41 and the motor housing 3 (at position KL) and between the shaft shoulder 18 and the fixed bearing 8 (at position DM). The two adjusting elements 10, 11 can be used to adjust both the width of the air gap between the rotor 6 and the first stator half 41 and the axial position of the axial flux machine 1 relative to the motor housing 3. If the axial position of the axial flux machine 1 relative to the motor housing 3 is somewhat variable, so that this position does not need to be adjusted in an exact manner, only one of the two adjusting positions KL or DM is required for the air gap width adjustment between the rotor 6 and the first stator half 41.

In order to adjust the air gap width between the rotor 6 and the second stator half 42, i.e., the fourth assembly group, the actual distances $DG_{actual}$, $ML_{actual}$, $KC_{actual}$ and $JI_{actual}$ are compared with the respective target distances $DG_{target}$, $ML_{target}$, $KC_{target}$ and $JI_{target}$, the deviations $\Delta DG$, $\Delta ML$, $\Delta KC$ and $\Delta JI$ are determined and the thicknesses of the adjusting elements 10, 11 selected for the positions DM and LK are taken into account. The thickness that the adjusting element 12 must have between the first and second stator halves 41, 42 (at position CJ) can then be determined in order to ensure the required air gap width between the rotor 6 and the second stator half 42.

Instead of measuring all four relevant assemblies at the beginning and then calculating all the thicknesses of the adjusting elements that need to be inserted between the assemblies before further assembly, only the three left-hand assemblies can be measured first, the adjusting element thicknesses required for the assembly of these three assemblies can be determined and then these three assemblies can be mounted together immediately. In order to be able to subsequently mount the remaining assembly of the axial flux machine 1 (the output-side stator half 41), the axial dimension GC (distance between the rotor side facing the second stator half 42 and the mounting surface of the output-side stator half 41) and the axial dimension JI must then be measured and compared with the target dimensions. This target/actual comparison can then be used to determine the correct thickness of the adjusting element, which is arranged between the two stator halves 41, 42 when the second stator half 42 (on the left in the figure) is mounted.

Figure 7:
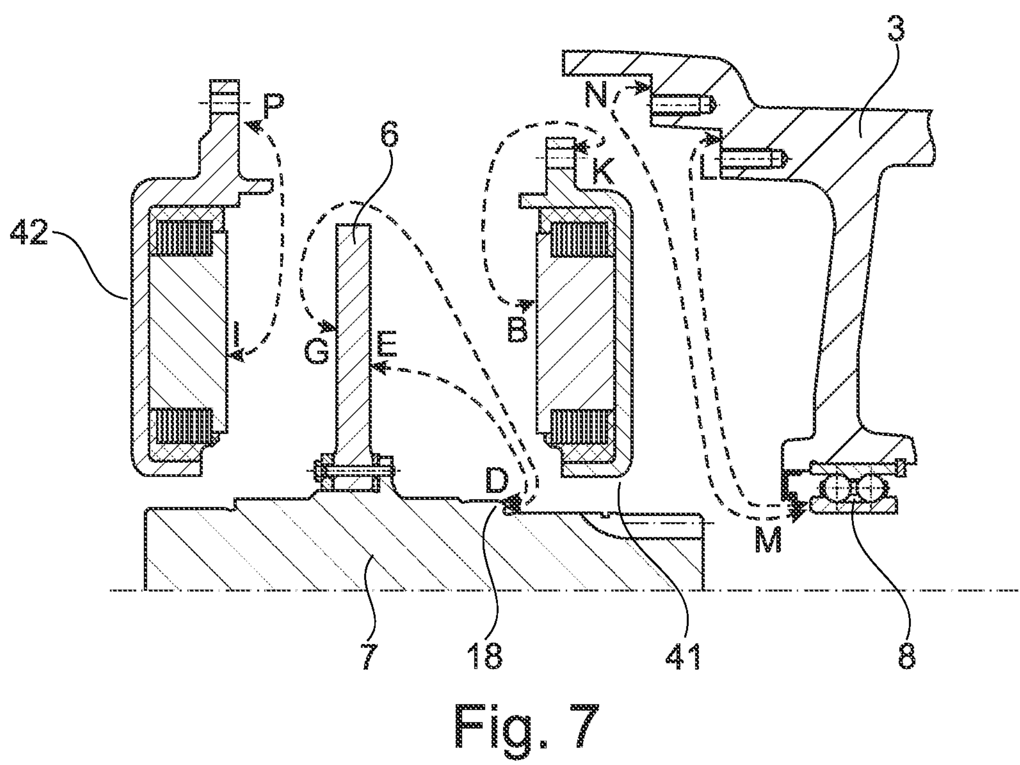
FIG. 7 shows an illustration of an installation method of an axial flux machine of the second embodiment with the contact surfaces of the assemblies.

FIG. 7 shows an assembly process for the second embodiment of the axial flux machine 1, which is shown in FIG. 2. Since this axial flux machine 1 differs from the previously described axial flux machine 1 only in the method of attachment of the fourth assembly with the second stator half 42 shown on the left, only the measuring and adjustment steps required for the correct alignment of the second stator half 42 of the fourth assembly will be discussed here. All measuring and adjustment steps that are possible or necessary for the alignment of the remaining assemblies correspond to the steps described above.

In order to adjust the air gap width between the rotor 6 and the second stator half 42 of the fourth assembly shown on the left, the actual distances $DG_{actual}$, $MN_{actual}$ and $PI_{actual}$ are compared with the respective target distances $DG_{target}$, $MN_{target}$ and $PI_{target}$, the deviations ΔDG, ΔMN and ΔPI are determined and the thickness of the adjusting element 10 selected for the position DM is taken into account. After that, the thickness that the adjusting element 13 must have between the motor housing 3 and the second stator half 42 of the fourth assembly can be determined in order to ensure the required air gap width between the rotor 6 and the second stator half 42 of the fourth assembly.

Alternatively, the output-side stator half 41 and the rotor 6 can be mounted on the motor housing 3 first and then the resulting axial distance between the rotor side facing the second stator half 42 and the screw-on surface on the motor housing 3 can be measured. The air gap width between the rotor 6 and the second stator half 42 can then be adjusted correctly by comparing the actual distances $GN_{actual}$ and $PI_{actual}$ with the target distances $GN_{target}$ and $PI_{target}$, by determining the deviations ΔGN and ΔPI and then arranging an adjusting element 13 between the second stator half 42 shown on the left and the motor housing 3 (between surface P and surface N), the thickness of which deviates from the nominal thickness of these adjusting elements 13 in such a way that the deviations ΔGN and ΔPI are compensated for.

The terms "radial", "axial" and "circumferential direction" as used above always refer to the rotation axis of the axial flux machine 1.

LIST OF REFERENCE SYMBOLS

1 Axial flux machine
3 Housing
4 Stator
41 First (output-side) stator half
42 Second stator half
43 Stator housing
6 Rotor
7 Rotor shaft
8 Fixed bearing
9 Floating bearing
81 Bearing inner ring
10, 11, 12, 13, 14, 15 Adjusting element
17 Sub-element
18 Shaft shoulder
51, 52 Stator magnet
20 Through bore
22 Projection
24 Hole
25 Screw

The invention claimed is:

1. An axial flux machine, comprising:
a housing;
a stator located in the housing, the stator having a first stator half and a second stator half, the first and second stator halves are fastened to the housing;
a rotor arranged between the first and second stator halves and non-rotatably connected to a rotor shaft which is rotatably mounted relative to the stator and the housing via bearing points;
a separate adjusting element, which adjusts an axial spacing between the rotor and the first and second stator halves, arranged between at least one of the first or second stator halves and the housing; and
a further adjusting element is arranged between the rotor and the rotor shaft or at one said bearing point between the rotor shaft and the housing, wherein the adjusting elements are comprised of several sub-elements stacked on top of one another in order to adjust a required adjustment dimension by a combination of a plurality of the sub-elements.

2. The axial flux machine according to claim 1, further comprising another adjusting element arranged between the first and second stator halves or in each case between both or one of the two stator halves and the housing.

3. The axial flux machine according to claim 2, wherein the rotor shaft is mounted on the housing via a bearing transmitting axial forces, the bearing has at least one bearing inner ring or one bearing outer ring and a further adjusting element is arranged at at least one axial end of the bearing inner ring or the bearing outer ring.

4. The axial flux machine according to claim 1, wherein there are a plurality of the adjusting elements with different thicknesses distributed around a circumference of the axial flux machine.

5. The axial flux machine according to claim 4, wherein when the plurality of adjusting elements is distributed over the circumference of the axial flux machine, the thickness of the adjusting elements increases or decreases from adjusting element to adjusting element.

6. The axial flux machine according to claim 1, wherein the two stator halves are connected to one another radially outside the rotor.

7. An electric machine arrangement comprising an axial flux machine according to claim 1, a power electronics unit, and a high-voltage battery.

8. An installation method for axially aligning a first assembly comprising a housing and a bearing, a second assembly comprising a first output-side stator half, a third assembly comprising a rotor and a rotor shaft, and a fourth assembly comprising a second stator half, relative to one another, comprising the following steps:
determining axial actual distances on surfaces of the first assembly, the second assembly, and the third assembly;
comparing the actual distances that are determined with specified target distances;
determining deviations of the actual distances from the respective target distances; and
calculating a thickness therefrom for a separate adjusting element between the surfaces of the first output-side stator half and the housing.

9. The installation method according to claim 8, further comprising calculating from the deviations a thickness for another separate adjusting element between the surfaces of a shaft shoulder of the rotor shaft and the bearing.

10. The installation method according to claim 9, wherein axial actual distances are determined on surfaces of the first assembly, the second assembly, the third assembly, and the fourth assembly,
the actual distances determined in this way are compared with the specified target distances,
the deviations of the actual distances from the respective target distances are determined, and
the required thickness of the adjusting element between the two stator halves is determined from the deviations and the selected thicknesses of the adjusting elements between the surfaces of the output-side stator half and the housing and between the surfaces of the shaft shoulder of the rotor shaft and the bearing are calculated, or
axial actual distances are determined on surfaces of the first assembly, the third assembly, and the fourth assembly, the actual distances determined in this way are compared with specified target distances, the deviations of the actual distances from the respective target distances are determined, and the required thickness of the adjusting element between the housing and the second stator half is determined from the deviations and the selected thickness of the adjusting element between the surfaces of the shaft shoulder of the rotor shaft and the bearing is calculated.

11. An axial flux machine, comprising:

a housing;

a stator located in the housing, the stator having a first stator half and a second stator half;

a rotor arranged between the first and second stator halves and non-rotatably connected to a rotor shaft which is rotatably mounted relative to the stator and the housing; and a separate adjusting element, which adjusts an axial spacing between the rotor and at least one of the first or second stator halves, arranged between the at least one of the first or second stator halves and the housing;

wherein there are a plurality of the adjusting elements with different thicknesses distributed around a circumference of the axial flux machine.

12. The axial flux machine according to claim 11, further comprising a further adjusting element is arranged between the rotor and the rotor shaft or at a bearing point between the rotor shaft and the housing.

13. The axial flux machine according to claim 12, further comprising another adjusting element such that said adjusting elements are arranged between each of the first and second stator halves and the housing.

14. The axial flux machine according to claim 13, wherein the rotor shaft is mounted on the housing via a bearing transmitting axial forces, the bearing has at least one bearing inner ring or one bearing outer ring and a further adjusting element is arranged at at least one axial end of the bearing inner ring or the bearing outer ring.

15. The axial flux machine according to claim 13, wherein the adjusting elements are comprised of several sub-elements stacked on top of one another in order to adjust a required adjustment dimension by a combination of a plurality of the sub-elements.

16. The axial flux machine according to claim 11, wherein when the plurality of adjusting elements is distributed over the circumference of the axial flux machine, the thickness of the adjusting elements increases or decreases from adjusting element to adjusting element.

* * * * *